(12) United States Patent
Lee

(10) Patent No.: US 9,359,007 B2
(45) Date of Patent: Jun. 7, 2016

(54) SUSPENSION SYSTEM FOR VEHICLE

(71) Applicant: Hyundai Motor Company, Seoul (KR)

(72) Inventor: Jong-woo Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/543,784

(22) Filed: Nov. 17, 2014

(65) Prior Publication Data

US 2015/0183462 A1    Jul. 2, 2015

(30) Foreign Application Priority Data

Dec. 30, 2013   (KR) .................. 10-2013-0167815

(51) Int. Cl.
*B62D 7/16*   (2006.01)
*B62D 7/20*   (2006.01)
*B62D 7/18*   (2006.01)
*B60G 3/20*   (2006.01)

(52) U.S. Cl.
CPC .. *B62D 7/18* (2013.01); *B60G 3/20* (2013.01); *B62D 7/163* (2013.01); *B62D 7/20* (2013.01); *B60G 2200/144* (2013.01); *B60G 2200/44* (2013.01)

(58) Field of Classification Search
CPC .......... B62D 7/163; B62D 7/16; B62D 7/166; B62D 7/20; B62D 7/00; B60G 2200/44; B60G 2204/422

USPC .......................... 280/93.502, 93.51
See application file for complete search history.

(56) References Cited

U.S. PATENT DOCUMENTS 4,632,413 A * 12/1986 Fujita ...................... B60G 3/01
280/124.103

FOREIGN PATENT DOCUMENTS

| JP | 2006-15809 A | 1/2006 |
|---|---|---|
| JP | 2006-76412 A | 3/2006 |
| JP | 2008-174056 A | 7/2008 |
| KR | 10-0534865 B1 | 12/2005 |
| KR | 20080104754 A * | 12/2008 |
| KR | 100884075 B1 * | 2/2009 |
| KR | 10-2009-0064976 A | 6/2009 |

* cited by examiner

*Primary Examiner* — Keith Frisby
(74) *Attorney, Agent, or Firm* — Morgan, Lewis & Bockius LLP

(57) ABSTRACT

A suspension system for a vehicle may include a knuckle assembled to a wheel, and a tie rod having one end assembled to a rack bar moving by operation of a steering wheel, another end assembled to the knuckle, and a linkage apparatus changing a pivot trajectory of the knuckle by moving a rotation center of a pivot trajectory of the tie rod when the vehicle bumps.

5 Claims, 6 Drawing Sheets

SUSPENSION SYSTEM FOR VEHICLE

CROSS-REFERENCE TO RELATED APPLICATION

The present application claims priority to Korean Patent Application No. 10-2013-0167815 filed in Dec. 30, 2013, the entire contents of which is incorporated herein for all purposes by this reference.

BACKGROUND OF THE INVENTION

1. Field of the Invention

The present invention relates to a suspension system for a vehicle. More particularly, the present invention relates to a suspension system for a vehicle that can minimize toe change when the vehicle bumps and the front wheel is to be toe-out when the vehicle turns.

2. Description of Related Art

The suspension system of a vehicle is a device disposed between the car body and the wheels and connecting the two rigid bodies, using one or a plurality of links. The suspension system mechanically appropriately controls the relative motion between the vehicle body and the wheels by carrying a vertical motion load with a chassis spring and a shock absorber and appropriately controlling high rigidity and flexibility in the other directions.

The suspension system is supposed to provide high riding comfort to passengers by effectively blocking irregular input from roads which is generated in traveling of a vehicle, and to provide convenience for driving by appropriately controlling shaking of a vehicle which is generated by non-smoothness of roads. Further, when a vehicle travels on a non-smooth road, it is required to secure safety of the vehicle in turning and braking by maintaining the vertical load on the surfaces of tires which are in contact with the ground at an appropriate level.

The suspension system according to the prior art causes over-steer when the vehicle turns at a high speed, thereby reducing steering stability, and the steering stability of the vehicle is improved by applying toe-out to the front wheel at the outside, when the vehicle turns at a high speed, in order to prevent the over-steer.

However, when the vehicle is bounced by up-down variation of the road during straight travelling, the front wheel of the vehicle is induced to toe-out and straight travelling performance is deteriorated.

Therefore, it needs to minimize variation of bump toe during straight travelling of the vehicle, and induce the front wheel to be toe-out when the vehicle rapidly turns.

FIG. 1 is a schematic rear view of a suspension system according to a conventional art. FIG. 2 is a schematic top plan view of a suspension system according to a conventional art.

As shown in FIG. 1 and FIG. 2, a conventional suspension system includes a knuckle 10 assembled to a wheel, a strut 20 assembled to an upper portion of the knuckle 10 and supporting a load of a vehicle, a lower arm 30 having one end assembling to a lower portion of the knuckle 10 and the other end assembling to a vehicle body, and a tie rod 40 having one end assembling to a rack bar and the other end assembling to the knuckle 10.

According to a conventional suspension system, when the vehicle bumps, one end of the knuckle 10 receives torque along a pivot trajectory based on an intersection line P intersecting an extension line of the lower arm 30 and an extension line perpendicular to the strut 20.

At this time, by defining a virtual arm 32 that is assembled to the knuckle 10 based on the intersection line P, one end of the knuckle 10 receives torque along a pivot trajectory by rotation of the virtual arm 32. That is, the strut 20 and the lower arm 30 can be replaced by the virtual arm 32 when the vehicle bumps.

The other end of the knuckle 10 receives torque along a pivot trajectory of the tie rod 40 assembled to the knuckle 10.

A radius of the pivot trajectory (refer to a dotted line of FIG. 1) formed by the virtual arm 32 based on the intersection line P is bigger than a radius of a pivot trajectory (refer to a one-point chain line of FIG. 1) formed by the tie rod 40.

As shown in FIG. 2, the virtual arm 32 and the tie rod 40 are positioned at a predetermined distance from each other With reference to the FIG. 2, the virtual arm 32 is positioned in front of the tie rod 40.

Therefore, when the vehicle bumps, the front of the knuckle 10 receives torque along the up-and-down direction based on the virtual arm 32, and the rear of the knuckle 10 receives torque along the up-and-down direction based on the tie rod 40.

Since the radius of the pivot trajectory formed by the tie rod 40 is smaller than the radius of the pivot trajectory formed by the virtual arm 32, the rear of the knuckle 10 is inwardly pulled and toe-out is generated.

As described above, when the bump is generated during straight travelling, unwanted toe-out is generated. The unwanted toe-out hinders straight travel of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a suspension system preventing toe-out when a vehicle bumps while the vehicle travels straight.

According to various aspects of the present invention, a suspension system for a vehicle may include a knuckle assembled to a wheel, and a tie rod having one end assembled to a rack bar moving by operation of a steering wheel, another end assembled to the knuckle, and a linkage apparatus changing a pivot trajectory of the knuckle by moving a rotation center of a pivot trajectory of the tie rod when the vehicle bumps.

The linkage apparatus may include a first link assembled to the rack bar, a fourth link rotatably assembled to the knuckle, a second link rotatably assembled to one end of the first link and one end of the fourth link, and a third link rotatably assembled to another end of the first link and another end of the fourth link.

A length of the fourth link may be longer than a length of the first link.

A connecting bar may be disposed in the fourth link, and the connecting bar and the knuckle may be assembled through a ball joint.

The suspension system for the vehicle may further include a driving unit providing driving torque for moving the first link along the up-and-down direction.

According to various aspects of the present invention, since the tie rod is configured as a four bar linkage and up-and-down direction pivot trajectory is changed, it is possible to prevent toe-out when the vehicle bumps while the vehicle travels straight.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
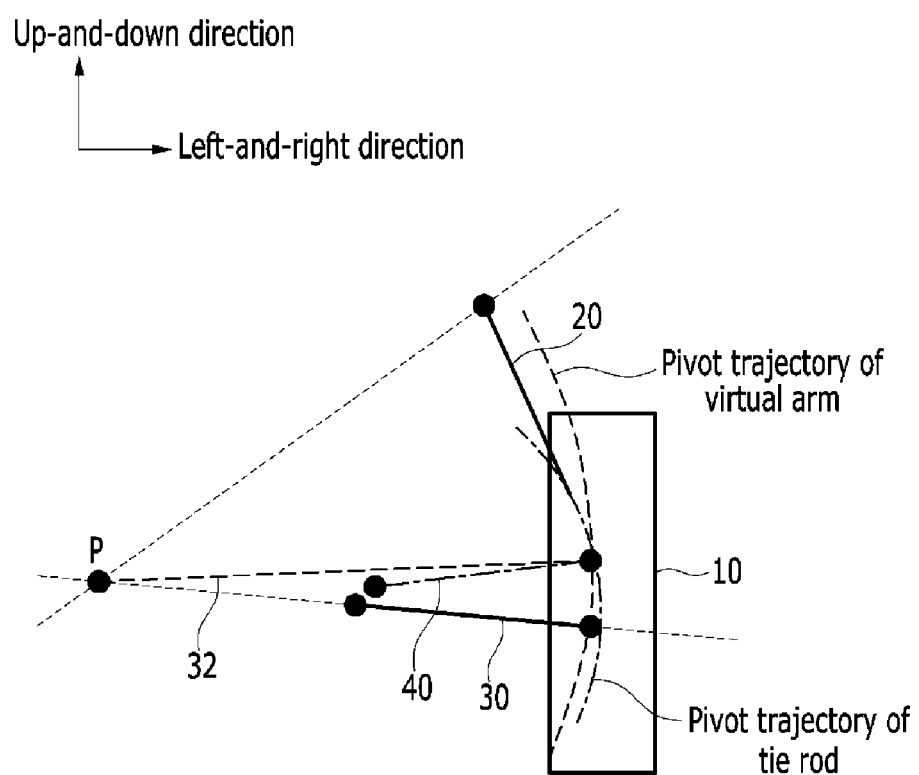
FIG. 1 is a schematic rear view of a suspension system according to a conventional art.
Figure 2:
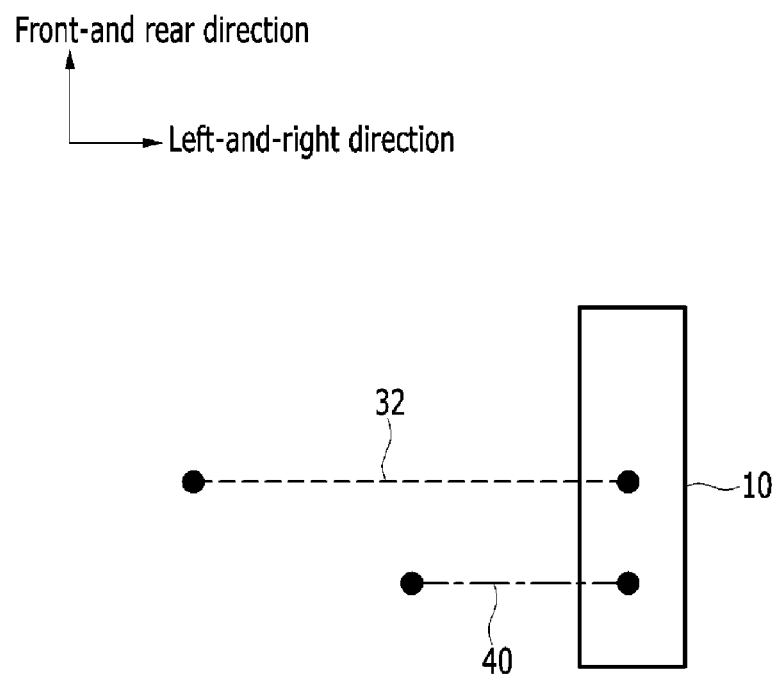
FIG. 2 is a schematic top plan view of a suspension system according to a conventional art.
Figure 3:
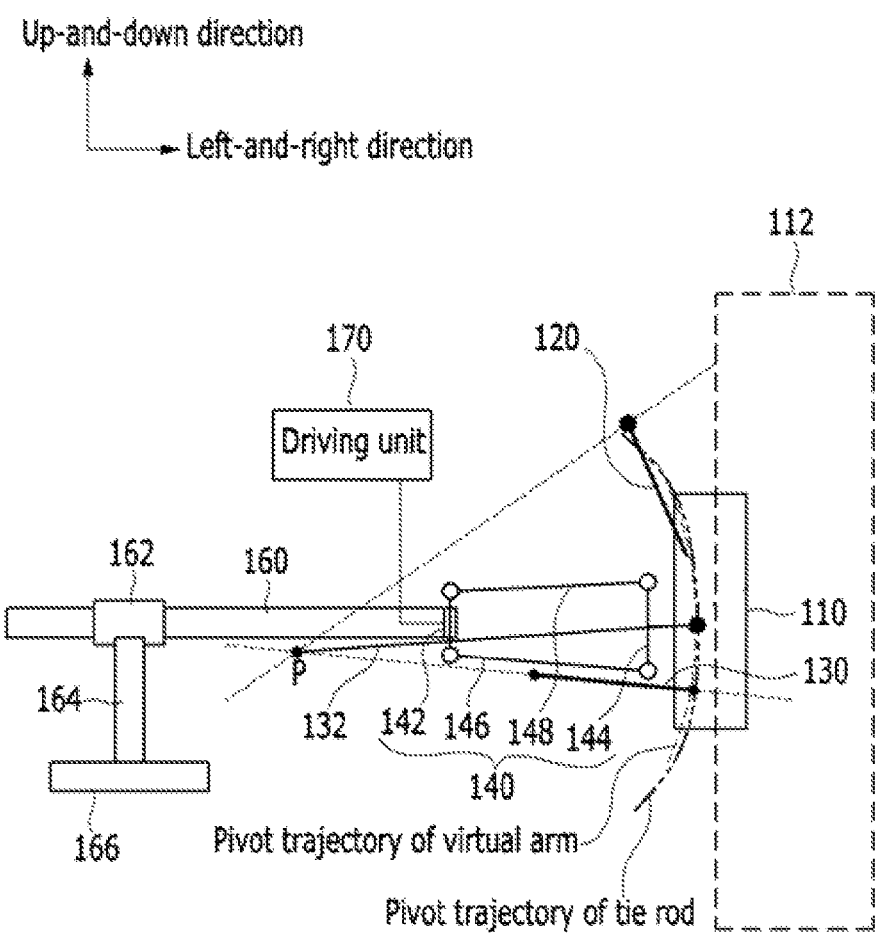
FIG. 3 is a schematic rear view of an exemplary suspension system according to the present invention.

FIG. 3 is a schematic rear view of a suspension system according to various embodiments of the present invention. And FIG. 4 is a schematic top plan view of a suspension system according to various embodiments of the present invention.

Figure 4:
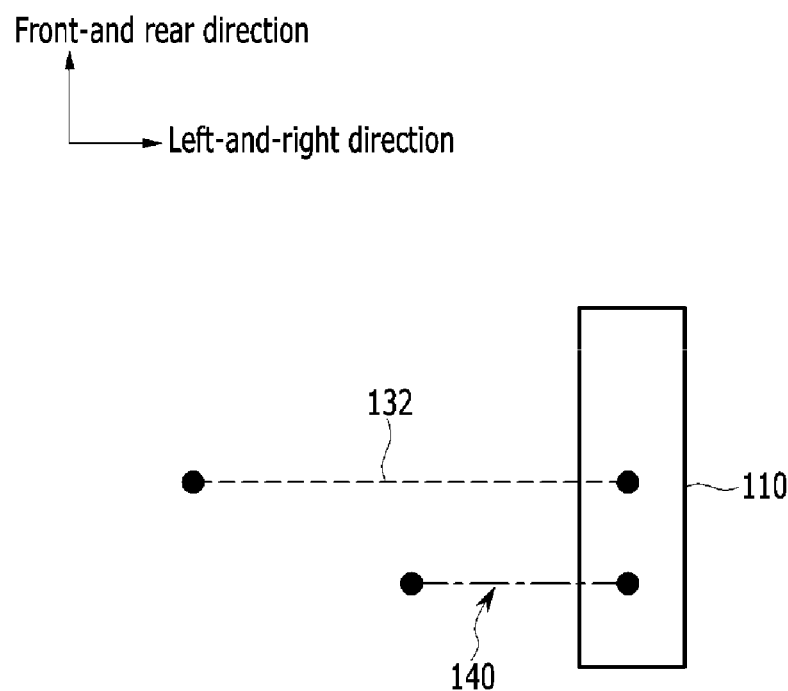
FIG. 4 is a schematic top plan view of the exemplary suspension system according to the present invention.

As shown in FIG. 3 and FIG. 4, a suspension system according to various embodiments of the present invention includes a knuckle 110 assembled to a wheel 112, a strut 120 having one end assembled to a vehicle body and the other end assembled to an upper portion of the knuckle 110, a lower arm 130 having one end assembled to the vehicle body and the other end assembled to a lower portion of the knuckle 110, and a tie rod 140 having one end assembled to a rack bar 160 moving by operation of a steering wheel 166, the other end assembled to the knuckle 110, and a linkage apparatus changing a pivot trajectory of the knuckle 110 by moving a rotation center when the vehicle bumps.

A shock absorber is embedded in the strut 120, an upper portion of the strut 120 supports the vehicle body, and a lower portion of the strut 120 is assembled to the knuckle 110.

The steering wheel 166 is connected to a pinion 162 by a steering axle 164. The pinion 162 is gear-meshed to a rack gear formed in the rack bar 160. The rack bar 160 is assembled to the knuckle 110 through the tie rod 140. The knuckle 110 and the tie rod 140 are connected through a ball joint.

When a driver operates the steering wheel 166, the pinion 162 is rotated, the rack bar 160 moves along a left or right direction, and thereby a direction of the wheel 112 is changed by rotation of the knuckle 110.

The linkage apparatus provided in the tie rod 140 is formed as a four bar linkage. That is, the linkage apparatus includes a first link 142 assembled to the rack bar 160, a fourth link 144 rotatably assembled to the knuckle 110, a second link 146 rotatably assembled to one end of the first link 142 and the fourth link 144, and a third link 148 rotatably assembled to the other end of the first link 142 and the fourth link 144.

A connecting bar 149 is disposed at the center of the fourth link 144, and the connecting bar 149 and the knuckle 110 are assembled through a ball joint. The fourth link 144 may be longer than the first link 142.

The second link 146 connects a lower end of the first link 142 and a lower end of the fourth link 144. A left end of the second link 146 and a lower end of the first link 142 are connected through a rotation joint, and a right end of the second link 146 and a lower end of the fourth link 144 are connected through a rotation joint. That is, the second link 146 is rotatably connected along the up-and-down direction with respect to the first link 142 and the fourth link 144.

The third link 148 connects an upper end of the first link 142 and an upper end of the fourth link 144. A left end of the third link 148 and an upper end of the first link 142 are connected through a ball joint, and a right end of the third link 148 and an upper end of the fourth link 144 are connected through a ball joint. That is, the third link 148 is rotatably connected along the up-and-down direction with respect to the first link 142 and the fourth link 144.

Meanwhile, a driving unit 170 that provides a driving torque for moving the first link 142 along the up-and-down direction may be provided at the first link 142. Since the driving unit 170 moves the first link 142 along the up-and-down direction, the driving unit 170b actively controls a toe change generated when the vehicle bumps.

Hereinafter, an operation of the suspension system according to various embodiments of the present invention will be described in detail with reference to accompanying FIG. 3, FIG. 4, FIG. 5 and FIG. 6.

For convenience of description, a point where the lower arm 130 and an extension line of a vertical line with respect to the strut 120 cross each other is defined as an intersection line P. The lower arm 130 and the strut 120 can be replaced by a virtual arm 132 assembled to the knuckle 110 based on the intersection line P.

At this time, the virtual arm 132 is positioned in front of the tie rod 140 based on FIG. 4.

Referring to FIG. 3 and FIG. 4, when the vehicle bumps, the center of the knuckle 110 receives torque along a pivot trajectory formed by the virtual arm 132 (refer to a dotted line of FIG. 3). At this time, the pivot trajectory formed by the virtual arm 132 is formed around the intersection line P.

A rear portion of the knuckle 110 receives torque along a pivot trajectory formed by the tie rod 140 (refer to a two-point chain line of FIG. 3).

Figure 5:
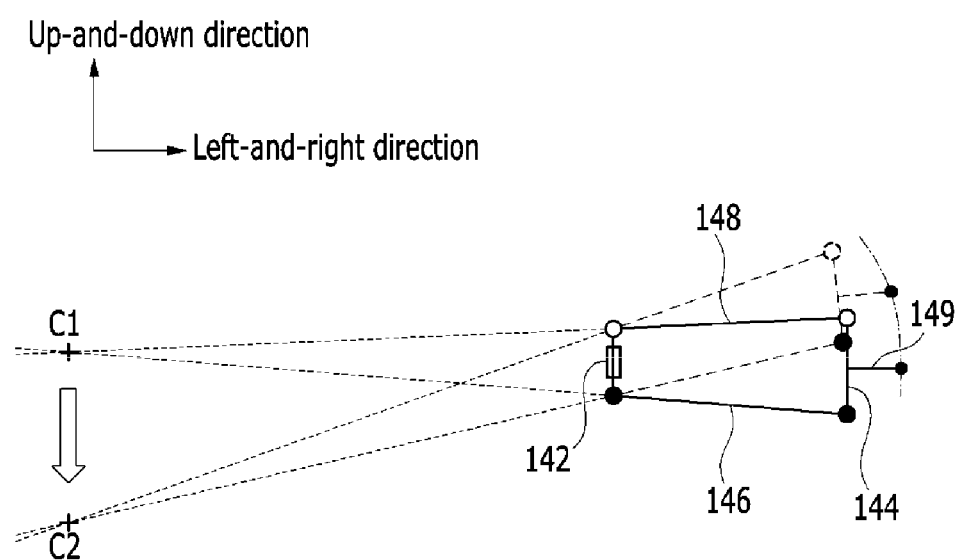
FIG. 5 is a schematic diagram of a tie rod in the exemplary suspension system according to the present invention.

Referring to FIG. 5, the pivot trajectory formed by the tie rod 140 is formed around a rotation center C1 formed by an extension line of the second link 146 and the third link 148 in an early stage of bumping.

However, the second link 146, third link 148, and fourth link 144 are upwardly rotated (anticlockwise based on FIG. 5) as the vehicle bumps. Therefore, a rotation center C2 formed by the extension line of the second link 146 and the third link 148 is downwardly moved with respect to the rotation center C1. That is, a rotation center of the pivot trajectory of the tie rod 140 moves from C1 to C2. A radius of the pivot trajectory formed by the tie rod 140 is thereby changed.

In particular, the radius of the pivot trajectory formed by the tie rod 140 is relatively small in the early stage of the bump. However, the radius of the pivot trajectory formed by the tie rod 140 becomes relatively big as the vehicle bumps. Therefore, the pivot trajectory formed by the tie rod 140 becomes similar to the pivot trajectory formed by the virtual arm 132.

As shown in FIG. 4, the center portion of the knuckle 110 receives torque along the pivot trajectory formed by the virtual arm 132, and the rear portion of the knuckle 110 receives torque along the pivot trajectory formed by the tie rod 140 when the vehicle bumps. At this time, since the pivot trajectory formed by the virtual arm 132 and the pivot trajectory formed by the tie rod 140 are similar, it is possible to minimize toe-out generated when the vehicle bumps.

For reference, a pivot trajectory formed by the tie rod 140 according to the conventional art and a pivot trajectory formed by the tie rod 140 according to various embodiments are compared.

Figure 6:
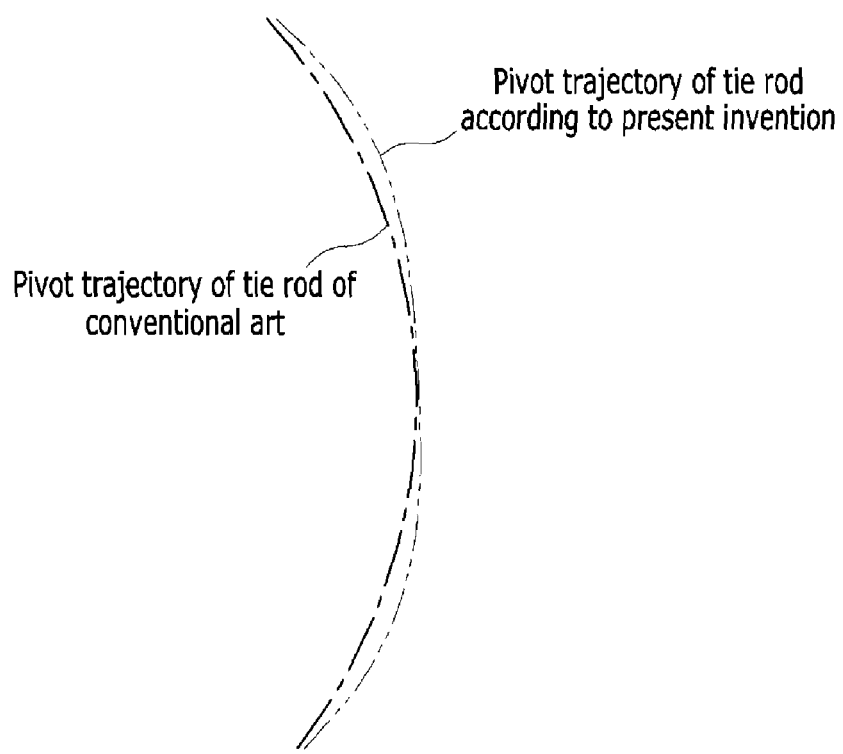
FIG. 6 is a schematic diagram of a pivot trajectory of a tie rod in the exemplary suspension system according to the present invention and a pivot trajectory of a tie rod according to a conventional art.

As shown in FIG. 6, the pivot trajectory (refer to a one-point chain line of FIG. 6) formed by the tie rod 140 is formed as a partial circle having the same radius as the conventional art. However, the pivot trajectory (refer to a two-point chain line of FIG. 6) formed by the tie rod 140 is changed, and thereby the pivot trajectory is formed as a smooth 'W' shape.

As described above, when a length of each linkage is adjusted, the pivot trajectory formed by the tie rod 140 can be changed. That is, the pivot trajectory formed by the tie rod 140 can be formed similar to the pivot trajectory formed by the virtual arm 132. Therefore, toe-out generated when the vehicle bumps can be prevented.

Further, when the length of the first link with respect to the length of the fourth link are appropriately adjusted, the toe change can be adjusted when the vehicle bumps. And when the first link is moved along the up-and-down direction by the driving unit, the bump toe can actually be adjusted.

In the above-described exemplary embodiments, the Macpherson strut type of suspension system has been described as an example. However, the present invention is not limited thereto. That is, the suspension system according to an exemplary embodiment of the present invention can be applied to a multi-link type of suspension system, a dual-link type of suspension system, a double wishbone type of suspension, etc.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A suspension system for a vehicle, comprising:
   a knuckle assembled to a wheel; and
   a tie rod having one end assembled to a rack bar moving by operation of a steering wheel, another end assembled to the knuckle, and a linkage apparatus changing a pivot trajectory of the knuckle by moving a rotation center of a pivot trajectory of the tie rod when the vehicle bumps.

2. The suspension system for the vehicle of claim 1, wherein the linkage apparatus comprises:
   a first link assembled to the rack bar;
   a fourth link rotatably assembled to the knuckle;
   a second link rotatably assembled to one end of the first link and one end of the fourth link; and
   a third link rotatably assembled to another end of the first link and another end of the fourth link.

3. The suspension system for the vehicle of claim 2, wherein a length of the fourth link is longer than a length of the first link.

4. The suspension system for the vehicle of claim 2, wherein a connecting bar is disposed in the fourth link, and the connecting bar and the knuckle are assembled through a ball joint.

5. The suspension system for the vehicle of claim 2, further comprising:
   a driving unit providing a driving torque for moving the first link along the up-and-down direction.

* * * * *